(12) United States Patent
Laurikka et al.

(10) Patent No.: US 6,608,996 B1
(45) Date of Patent: Aug. 19, 2003

(54) COVER FOR AN ELECTRONIC DEVICE

(75) Inventors: Salla Laurikka, Tampere (FI); Jari Ijäs, Helsinki (FI); Tapio Hämeen-Anttila, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 391 days.

(21) Appl. No.: 09/641,475

(22) Filed: Aug. 18, 2000

(30) Foreign Application Priority Data

Aug. 20, 1999 (FI) .............................................. 19991780

(51) Int. Cl.⁷ ................................................. H04B 1/38
(52) U.S. Cl. .................... 455/90; 455/550; 455/566; 340/7.61; 340/7.55
(58) Field of Search ................................. 455/566, 550, 455/90; 340/7.61, 7.55, 815.4, 815.65

(56) References Cited

U.S. PATENT DOCUMENTS

| | | | | |
|---|---|---|---|---|
| 4,975,694 A | * | 12/1990 | McLaughlin et al. | 340/7.55 |
| 5,005,013 A | * | 4/1991 | Tsukamoto et al. | 340/7.56 |
| 5,793,304 A | * | 8/1998 | Sone | 340/7.55 |
| 5,877,695 A | * | 3/1999 | Kubes et al. | 313/506 |
| 5,946,636 A | * | 8/1999 | Uyeno et al. | 455/566 |
| 6,032,024 A | * | 2/2000 | Makino | 340/7.55 |
| 6,035,180 A | * | 3/2000 | Kubes et al. | 313/509 |
| 6,094,587 A | * | 7/2000 | Armanto et al. | 379/373.03 |
| 6,120,839 A | * | 9/2000 | Comiskey et al. | 264/4.1 |
| 6,380,922 B1 | * | 4/2002 | Lynch et al. | 324/435 |

FOREIGN PATENT DOCUMENTS

EP 564127 A2 * 10/1993

OTHER PUBLICATIONS

E-Ink white paper.*
"High resolution electronic ink displays for smart hand held devcies".–E.INK web page publication.*

* cited by examiner

*Primary Examiner*—Dwayne Bost
*Assistant Examiner*—Sujatha Sharma
(74) *Attorney, Agent, or Firm*—Perman & Green, LLP

(57) ABSTRACT

A cover (1) of an electronic device (7) is at least partly formed or coated by using a material whose color is arranged changeable at least partly by means of at least one control signal.

22 Claims, 4 Drawing Sheets

COVER FOR AN ELECTRONIC DEVICE

Figure 1:
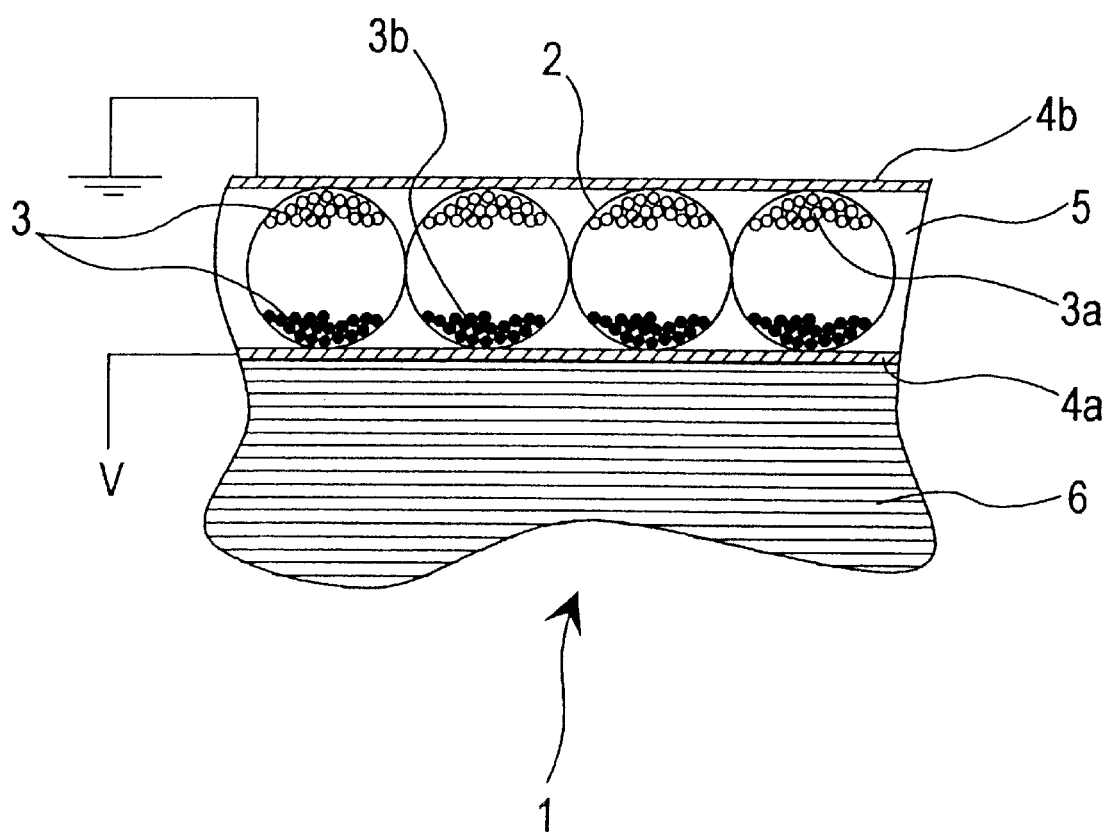

The present invention relates to a cover for an electronic device according to the preamble of claim 1. Furthermore, the invention relates to an electronic device according to the preamble of claim 7 and a wireless communication device according to the preamble of claim 22.

If the user wishes to change the outer appearance of his/her electronic device, s/he has to buy a new cover of the desired kind, and have the cover changed into the new one for example in a store of domestic appliances. Thus, extra expenses are caused for the user for buying the cover and having it changed. Furthermore, the old covers are often unnecessary for the user. On the other hand, at present there are e.g. covers for a wireless communication device, whose colour seems to change slightly when the angle of view or the inlet angle of light changes with respect to the cover of the wireless communication device. It is not, however, possible to change the colour of such a cover in a controlled manner.

In wireless communication devices, in a solution of prior art, a call which has remained unanswered or a text message which has arrived is indicated by means of a text or icon formed on the display of the wireless communication device. In order to find out whether a call or a text message has arrived, the user of the wireless communication device has to view the display of the wireless communication device carefully.

Typically, the sound of the wireless communication device has to be switched off for example in a negotiation, so that other people would not be disturbed. Thus, the user has to look at the display often in order to notice when for example a call is arriving, or when a new text message has arrived. This constant act of keeping watch over the wireless communication device is not a very user-friedly solution. Alternatively, it is possible to use a vibration alarm in the wireless communication device. When such a vibration alarm is used, the wireless communication device should be positioned in such a way that it is sufficiently close to the body of the user, so that the vibration can always be detected. In many situations, it is, however, difficult to find such a location from which the wireless communication device could also be easily taken out.

The purpose of the present invention is to eliminate these drawbacks to a large degree, and to produce a cover for an electronic device whose colour can be changed repeatedly and quickly by means of at least one control signal without detaching the cover.

According to the invention, this purpose can be attained by manufacturing the cover or part of it from such a material or by coating the cover or part of it with such a material which changes its colour under the effect of a control signal.

More precicely, the cover for an electronic device according to the invention is characterized in what will be presented in the characterizing part of claim 1. The electronic device according to the invention is characterized in what will be presented in the characterizing part of claim 7. The wireless communication device according to the invention is characterized in what will be presented in the characterizing part of claim 22.

With the present invention, considerable advantages are achieved when compared to solutions of prior art. When an electronic device is equipped with a cover whose colour can be changed by means of a control signal, the colour or patterns on the cover can be changed rapidly without detaching the cover. If the wireless communication device is equipped with a cover which changes its colour by means of a control signal, the user can determine, even at a distance on the basis of the colour of the cover whether calls or text messages have arrived. In situations where the sound of the wireless communication device has to be switched off, the cover which changes its colour functions as a good indicator of the arriving call or text message and it does not disturb others. The change of the colour of the cover can also indicate a state of the device or the mobile communication network. The operator could be given the possibility to change the colour or patterns on the cover for example if the device is stolen, wherein the stolen wireless communication device could be easily recognized. When desired, the user can also change the colour or patterns on the cover rapidly from the menu of the wireless communication device without detaching the cover.

Figure 2:
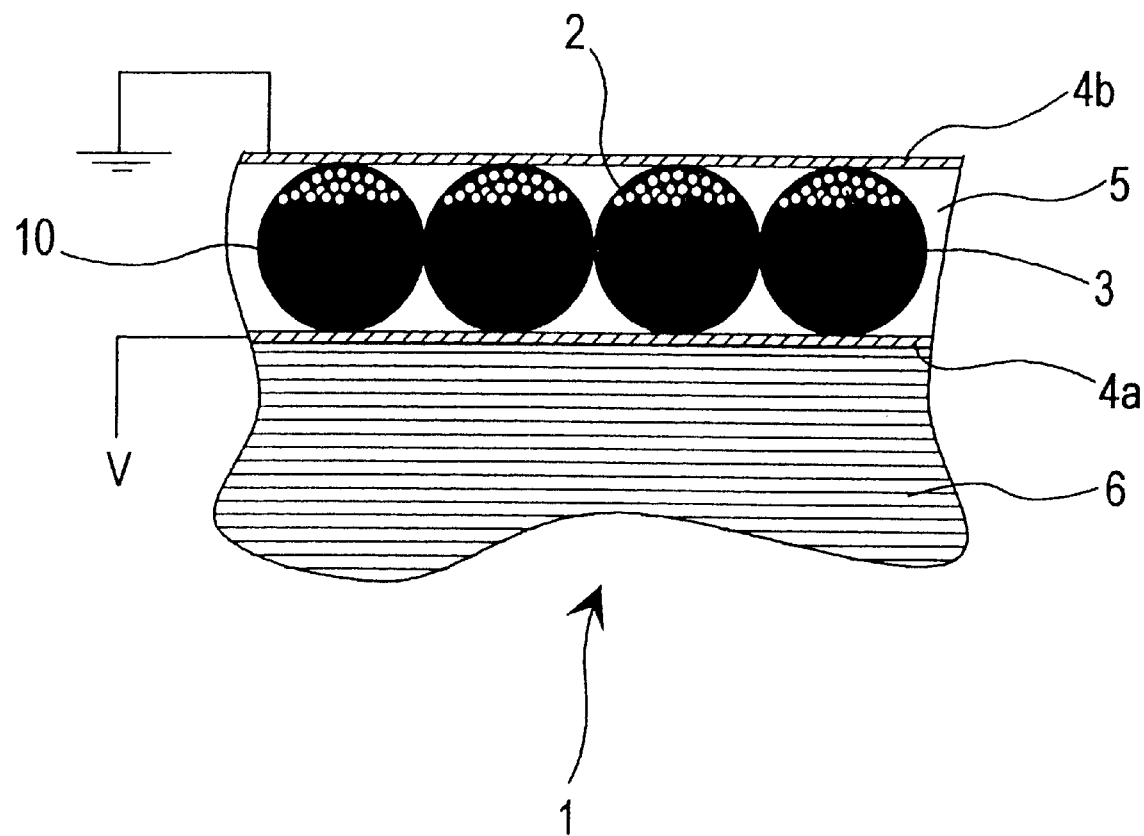
Figure 3:
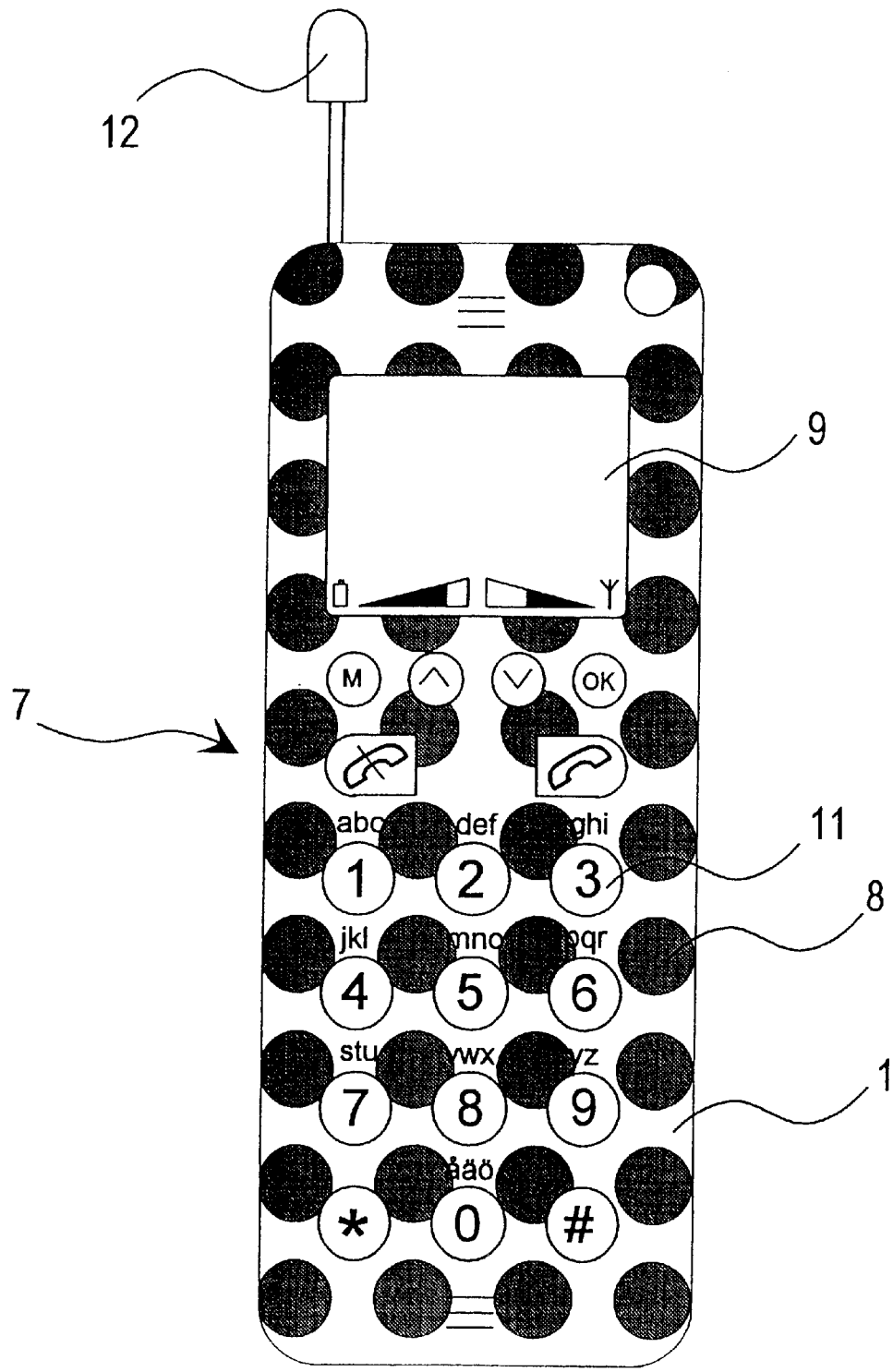
Figure 4:
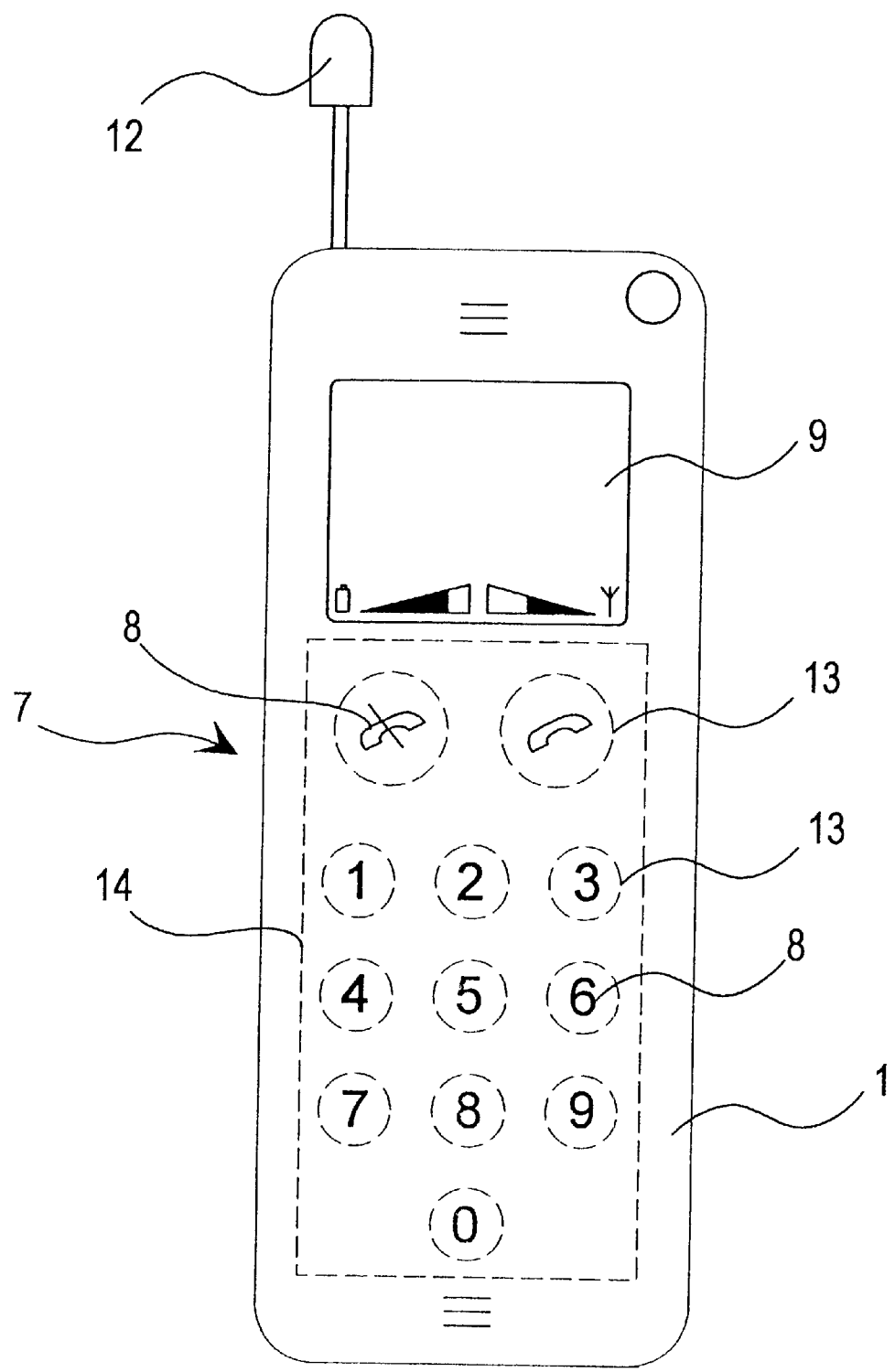

In the following, the invention will be described in more detail with reference to the appended drawings, which show a wireless communication device according to a preferred embodiment of the invention, equipped with a cover whose colour can be changed by means of a control signal. In the drawings FIG. 1 shows a cross-section of the cover of an electronic device, FIG. 2 shows a cross-section of another cover of an electronic device, FIG. 3 shows a top-view of a wireless communication device according to a preferred embodiment of the invention, FIG. 4 shows a top-view of a wireless communication device according to another preferred embodiment of the invention.

A cover 1 for an electronic device 7, whose colour can be changed by means of a control signal, is advantageously produced by using a material which changes its colour as a result of the effect of an electric or electromagnetic control signal for manufacture and coating of the parts of the cover whose colour is desired to be changed. Such a material is for example electronic ink (E-INK) 5 with which a conventional cover 6 of the electronic device is coated.

One example of such electronic ink typically contains positively or negatively charged particles 3 inside microcapsules 2, in such a way that the positively and negatively charged particles 3 have different colours. By conducting an electric control signal V into the microcapsule 2 via conductors 4a and 4b, it is possible to make e.g. the negatively charged particles 3b to move to the upper part of the capsule and the positively charged particles 3a to the lower part. Thus, the colour produced on the surface is the colour of the negatively charged particles 3b, and the colour of the positively charged particles 3a does not substantially show on the surface through the negatively charged particles. It is typically characteristic to the electronic ink that the state of the particles set by the control signal is maintained until the state is changed again by means of the control signal, i.e. only the act of changing the state of the particles requires energy.

Alternatively, the electronic ink 5 contains only positively 3a or negatively 3b charged particles inside the microcapsules. The microcapsules are filled with coloured liquid 10. By conducting the electric control signal V to the microcapsule 2 via the conductors 4a and 4b, it is possible to make the particles to move to the upper or lower part of the microcapsule 2. If the particles move to the upper part of the microcapsule 2, the colour produced on the surface is substantially the colour of the particles. If, however, the particles are moved to the lower part of the microcapsule 2, the colour produced on the surface is substantially the colour of the coloured liquid 10 contained in the microcapsule.

On top of and underneath the electronic ink 5, electrically conductive layers 4a and 4b are arranged as conductors according to prior art known as such, so that the control signal could be conducted to the microcapsules 2. The layer 4b to be placed on top of the electronic ink should be at least partly transparent, because otherwise the change in the colour of the cover 1 cannot be detected.

At present, the aim is to attain as low a power consumption as possible for the electronic devices 7, so that their operating time would be as long as possible. Because of this, the solution implemented by means of electronic ink is advantageous in view of power consumption, because the maintaining of the set colour does not consume energy. Only the act of changing the colour on the cover 1 of the electronic device 7 requires energy.

The cover 1 of the electronic device 7 which changes colour by means of the control signal, is advantageously applicable to be used in wireless communication devices 7. For this reason, in this description a wireless communication device is primarily used as an example of the electronic device, and the cover of a wireless communication device is used as an example of the cover of the electronic device. The electronic device can also be for example a battery, a charger of a battery or a receiver/microphone combination.

The cover 1 of the wireless communication device 7 can function as an indicator which indicates that calls or text messages have arrived by changing the colour of the cover 1. The user can switch on such a coloured cover indicator function from the menu of the wireless communication device, wherein the colour of the cover 1 of the wireless communication device is changed when a call or a text message arrives. This takes place advantageously in such a way that in the wireless communication device a control signal is conducted to the conductors 4a and 4b of the cover, wherein the particles 3 on the surface of the cover of the device change places in the microcapsule 2 as a result of the change in the charge state produced by the control signal. If the negatively charged particles 3b are in the upper part of the microcapsule 2, they move to the lower part of the microcapsule, and the positively charged particles 3a move to the upper part of the capsule. Correspondingly, if the positively charged particles 3a are in the upper part of the microcapsule 2, they move to the lower part of the microcapsule and the negatively charged particles 3b move to the upper part of the capsule. When the positively and negatively charged particles change places, the colour of the cover changes. When the colour has changed, the user can, even at a distance, see that a call or a text message has arrived. Thus, the user can acknowledge the messages and/or calls that have arrived in a corresponding manner as in wireless communication devices of prior art, for example by pressing a key, wherein the colour of the cover is changed.

Such a coloured cover indicator can also be used for example in situations when the sound of the wireless communication device 7 has been switched off. In such a situation, the user can position the wireless communication device in a place where it can be seen, When a call or a text message arrives in the wireless communication device 7, the wireless communication device indicates this to the user by changing the colour of the cover 1. When the user has noticed that the wireless communication device 7 has changed the colour of the cover 1, s/he can answer the call, read the text message or move to a place where s/he can make a call without disturbing anyone.

The cover 1 of the wireless communication device 7 can also be arranged to indicate that call is arriving or has arrived and/or that text messages have arrived in such a way that the wireless communication device starts to change the colour of the cover constantly, i.e. it starts to flash. When a call is coming, the user can answer the incoming call, wherein the flashing of the cover is stopped. If the flashing is due to the fact that calls and/or text messages which have not been answered have arrived to the wireless communication device, the flashing is stopped by acknowledging the calls and/or text messages that have arrived in a corresponding manner as in wireless communication devices of prior art, for example by pressing a key.

By means of the technique according to the invention it is possible to implement a permanent change in the colour of the cover 1 without separate mechanically changeable coloured covers. If desired, the user can change the colour of the cover 1 by selecting the desired colour from the colours available in the menu of the wireless communication device 7. This selection is maintained until the user changes the colour of the cover 1 again, i.e. until a new control signal is conducted to the cover. Furthermore, the change of the cover does not cause any extra expenses for the user even if s/he changed the colour of the cover often.

It is possible to change the colour of the entire cover 1 of the wireless communication device 7 or part of it at a time. From the menu of the wireless communication device the user can select the desired pattern from a selection of several complete patterns 8 of the cover surface. The user can also retrieve the desired pattern from a service provider, for example in a similar way as different ringing tones can be retrieved. The user searches the desired pattern from an Internet page of a service provider. The desired pattern is retrieved by transmitting a request, advantageously in a text message, to the service provider, wherein the information necessary for implementing the desired pattern is transmitted to the wireless communication device requesting the pattern for example in a text message. The information necessary for implementing the desired pattern can also be retrieved from the service provider by means of WAP (Wireless Application Protocol). Thereafter the user can store the received information in the memory of the communication device and implement the desired pattern. WAP is a specification for a group of protocols. It is used to standardize the connection of wireless telecommunication devices, such as mobile phones, to the Internet.

In order to be able to form different patterns 8 on the surface of the cover 1, it has to be possible to change the colour on the cover of the wireless communication device 7 in small sections. This can be implemented for example in such a way that the electrically conductive layer 4a underneath the electronic ink 5 is formed as a matrix. Thus, it is possible to use the control signal to control one microcapsule or a small group of microcapsules at a time. The desired pattern can be formed from these small areas which can be controlled separately by means of control signals.

The cover 1 of the wireless communication device 7 can also function as an indicator which indicates a particular change by changing the colour or the pattern 8 of the cover 1. Besides indicating that a call or a text message is arriving/has arrived, the change of the colour or pattern of the cover can also indicate the state of the device and the mobile communication network. By changing the colour or pattern of the cover, it is possible to give an alarm, a warning or a message for the user of the state of the device or the mobile communication network, for example by changing the colour of the cover, it is possible to warn the user that the charge of the battery is weak, report a weak signal strength, or give an alarm in case of a failure. In connection with a wireless communication device according to a preferred embodiment of the invention, the operator of the mobile communication network can change the colour and pattern 8 on the cover 1 of a stolen wireless communication device 7, so that it would be as easy as possible to detect the stolen wireless communication device. This can be advantageously implemented in such a way that when the telephone is reported stolen, the operator transmits a command to the telephone, with the result that the stolen wireless communication device 7 changes the colour and pattern of its cover 1. This change is preferably effective until the operator cancels the change. The cover can also be used to indicate the conditions outside the wireless communication device, for example the temperature, air pressure or altitude, by changing the colour or pattern 8 of the cover.

The user can switch on such a a coloured cover indicator function from the menu of the wireless communication device, wherein the colour or pattern 8 on the cover 1 of the wireless communication device 7 is changed when a condition of the indicator is fulfilled. The colour or pattern on the cover of the wireless communication device is changed back when the condition that has triggered the indicator is no longer fulfilled, or the user acknowledges the situation for example by pressing a key in the wireless communication device. From the menu of the wireless communication device the user can determine what is desired to be indicated with the change of the colour or pattern 8 of the cover. The user can also determine which pattern and/or colour is formed in a particular situation. Thus the change of the colour and/or pattern on the cover 1 of the wireless communication device 7 can be used to indicate several different situations.

The user of the wireless communication device 7 can form caller groups with different features from the numbers stored in the memory. The user can, for example, select the way in which the colour or pattern 8 on the cover 1 of the wireless communication device 7 is going to be changed when a call arrives from a number set in the caller group, or whether the colour or pattern 8 is to be changed at all. Thus, the user can quickly determine, even at a distance, by looking at the wireless communication device 7, to which caller group the caller belongs.

The cover 1 of the wireless communication device 7 can be arranged to change its colour or pattern 8 when a caller during an attempted call for example keyes in a control command, or when someone for example transmits a text message to the wireless communication device, the message containing a command to change the colour or pattern of the cover that can be understood by the communication device. On the basis of this, the wireless communication device can change the colour or pattern 8 of the cover, wherein on the basis of the colour or pattern the user detects who has been trying to call or otherwise reach him/her.

In some applications, it is also possible to transmit such information which is not naturally included in the operation of the wireless communication device. In order to avoid having to watch such information, for example advertisements, on the display 9 of the wireless communication device 7, the user can for example utilize the menu of the wireless communication device to activate the cover or a part of it to present this information. This can be implemented advantageously in such a way that the information to be transmitted to the wireless communication device is divided at least to a first and a second class, of which the first class information is shown on the display 9 of the wireless communication device, and the second class information is shown in the cover.

The display 9, keyboard 11, and/or antenna 12 of the wireless communication device 7 can be arranged to change colour by producing the part from a material which changes colour under the effect of an electric or electromagnetic control signal. The display, the keyboard and/or the antenna can be arranged to change colour by means of the control signal in a similar way as presented in connection with the colour change of the cover. The colour can be changed for example when a call or a text message arrives, when the state of charge of the battery is weak, or when the user sets the colour on the display to a different one by means of the menu of the wireless communication device.

The invention can also be applied in such a way that a part of the surface of the wireless communication device is allocated as a display, wherein a separate display is not necessary in the wireless communication device. Thus, the cover 1 of the wireless communication device 7 has to implemented in such a way that the colour of the cover can be changed in sufficiently small parts at a time as is presented in the section discussing the formation of the pattern on the cover 1.

When a cover according to a preferred embodiment of the invention is used, the keyboard 11 of the wireless communication device 7 can be replaced by providing the cover with a means 14 recognizing the contact point, for example a film which is sensitive to a touch, at least partly in connection with a part 5 changing the colour of the cover 1, in such a way that the user can detect the change in the colour of the cover also at the location of the means 14 recognizing the contact point. Thus, in the area of the means recognizing the contact point, it is possible to substantially freely determine activation areas 13 for implementing key functions. These activation areas 13 can be exposed to the user by changing the colour of the cover in small parts at the location of the activation areas. Thus, the user can increase the individuality of the wireless communication device by creating a desired combination, order and appearance of the keys. For example the functions of the wireless communication device could be restricted in such a way that the telephone would contain only the necessary keys for children, aged people and emergency calls. Furthermore, it could be possible to transmit a special set of keys necessary for a particular service, wherein the service providers and the manufacturers would have better possibilities to develop new, more advanced services for the users of wireless communication devices.

The cover 1 of the wireless communication device 7, whose colour can be changed by means of control signals, can also be implemented by arranging an element similar to the display element used in computers on top of the cover of the wireless communication device. Thus, the cover of the wireless communication device functions as a flat display whose outer appearance can be controlled in a similar way as the displays of portable computers. At present, there are several known techniques for manufacturing thin high-resolution colour displays, which can conform to the surface to be coated. One such technique is LEP (Light Emitting Polymers).

The cover 1 of the electronic device 7, whose colour can be changed by means of control signals, can be advantageously applied also in a radio comprising RDS (Radio Data System) or another corresponding system. Thus, the radio can obtain its control command for example in connection with a radio transmission. Thus, the colour on the cover of the radio can change for example when music, news or sports is broadcasted.

The present invention is not restricted solely to the embodiments presented above, but it can be modified within the scope of the appended claims.

What is claimed is:

1. A cover (1) of an electronic device (7), characterized in that the cover (1) is at least partly formed or coated by using electronic ink (5) whose colour is changeable at least partly by means of at least one control signal, said electronic ink, containing electrically charged particles (3), and that in connection with, conductors (4a, 4b), in the cover, for conducting the control signal to the electronic ink (5), to attain a change in the colour of the cover.

2. The cover (1) of the electronic device (7) according to claim 1, characterized in that said material is electronic ink (5) which contains electrically charged particles (3), and that in connection with the cover, there are conductors (4a, 4b) for conducting the control signal to the electronic ink (5), wherein the location of the particles in the electronic ink is arranged changeable to attain a change in the colour of the cover.

3. The cover (1) of the electronic device (7) according to claim 1, characterized in that the electronic ink (5) comprises positively charged particles (3a) and negatively charged particles (3b), and that. at least some of the positively charged particles are different in colour than the negatively charged particles.

4. The cover (1) of the electronic device (7) according to claim 1, characterized in that the electronic ink (5) comprises charged particles (3) and coloured liquid (10), and at least part of the charged particles are different in colour than the coloured liquid.

5. The cover (1) of the electronic device (7) according to claim 2, in which the electronic ink contains microcapsules, characterized in that the particles (3) are placed in the microcapsules.

6. The cover (1) of the electronic device (7), according to claim 1, characterized in that a fixed section on the surface of the cover (1) is arranged to function as a display (9).

7. An electronic device (7) which comprises a cover (1), characterized in that the cover is at least partly formed or coated by using electronic ink (5) whose colour is changeable at least partly by means of at least one control signal, said electronic ink, containing electrically charged particles (3), and that in connection with, conductors (4a, 4b), in the cover, for conducting the control signal to the electronic ink (5), to attain a change in the colour of the cover.

8. The electronic device (7) according to claim 7, characterized in that it is a wireless communication device (7).

9. The wireless communication device (7) according to claim 8, characterized in that the wireless communication device (7) is provided with the possibility to change the colour of the cover (1) repeatedly.

10. The wireless communication device (7) according to claim 8, characterized in that the wireless communication device (7) is provided with a group of surface pattern information to produce different surface patterns on the surface of the cover (1), means (11) for selecting the surface pattern (8) of the cover (1) from said group of surface pattern information, and means (4a, 4b, V) for changing the colour of the cover to comply with the selected surface pattern.

11. The wireless communication device (7) according to claim 9, which comprises means for receiving text messages and calls, characterized in that the colour of the cover (1) is arranged at least partly changeable when a text message has arrived, a call is coming, or a call that has arrived has remained unanswered.

12. The wireless communication device (7) according to claim 9, which comprises means for receiving text messages and calls, characterized in that the caller has been provided with the possibility to change the colour of the cover (1) by keying a control command or transmitting a text message to the wireless communication device, on the basis of which the wireless communication device is arranged to change the colour of the cover (1).

13. The wireless communication device (7) according to claim 11, characterized in that the user has been provided with the possibility to define caller groups, which definition of the caller group comprises at least the steps of selecting the number of the caller, and selecting whether the colour of the cover (1) is changed if a call arrives from a number belonging to the caller group in question and which colour is then changed on the cover.

14. The wireless communication device (7) according to claim 11, characterized in that the colour of the cover (1) is arranged to change at least partly at intervals when a text message has arrived, a call is arriving, or a call that has arrived has remained unanswered.

15. The wireless communication device (7) according to claim 9, which comprises means for establishing a data transmission connection to a mobile communication network, characterized in that it is arranged to indicate a state of the wireless communication device (7) or the mobile communication network by means of at least partly changing of the colour of the cover (1).

16. The wireless communication device (7) according to claim 15, characterized in that the user is provided with the possibility to determine the changes that are desired to be indicated and the colour and/or surface pattern (8) which is produced in a given situation.

17. The wireless communication device (7) according to claim 10, which comprises means for establishing a data transmission connection to a data processor of at least one service provider, characterized in that the wireless communication device (7) comprises means for transferring surface pattern information from said data processor to the wireless communication device via said data transmission connection.

18. The wireless communication device (7) according to claim 17, characterized in that said means for transmitting surface pattern information comprise means for formulating and transmitting text messages to said data processor, which text message contains information on the surface pattern information selected to be transmitted.

19. The wireless communication device (7) according to claim 10, which comprises means for establishing a data transmission connection to the data processor of at least one service provider, characterized in that the wireless communication device (7) comprises means for transmitting surface pattern information from said data processor to the wireless communication device by means of WAP.

20. The wireless communication device (7) according to claim 10, characterized in that the cover (1) is provided with a means (14) recognizing the contact point, into which means (14) activation areas (13) can be arranged substantially freely to implement key functions, wherein the colour of the cover (1) is arranged to be changed at least partly at the location of at least one activation area (13).

21. The wireless communication device (7) according to claim 10, characterized in that the information transmitted thereto is divided at least into a first and a second class, of which the first class information is arranged to be presented on a display (9) of the wireless communication device and the second class information is arranged to be presented in the part of the cover (1) that changes the colour.

22. The wireless communication device (7), characterized in that the display (9), a keypad (11) and/or an antenna (12) are at least partly formed or coated by using electronic ink (5) whose colour is changeable at least partly by means of at least one control signal, said electronic ink, containing electrically charged particles (3), and that in connection with, conductors (4a, 4b), in the cover, for conducting the control signal to the electronic ink (5), to attain a change in the colour of the cover.

* * * * *